Figure 1:
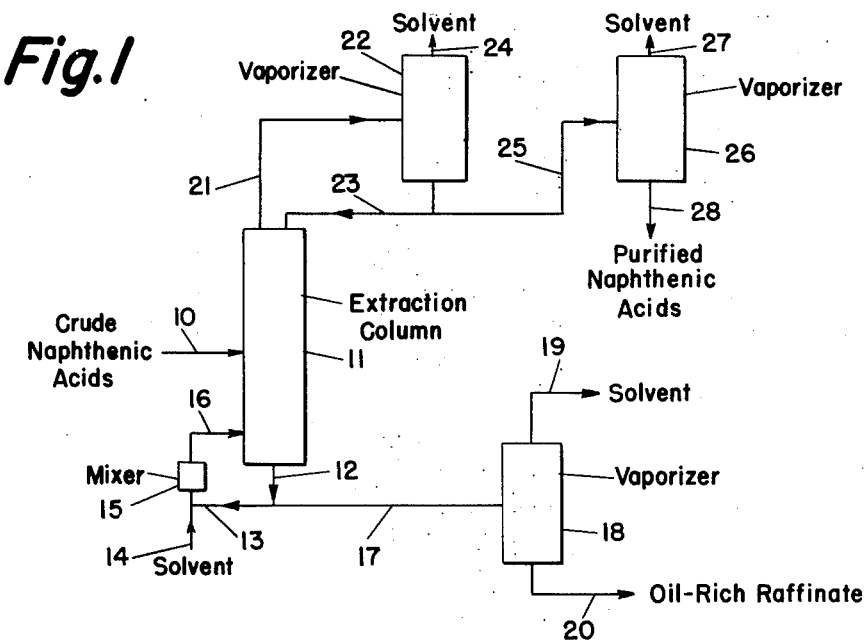

May 5, 1953  S. E. JOLLY  2,637,744
EXTRACTION OF NAPHTHENIC ACIDS
Filed Feb. 24, 1950

INVENTOR.
SAMUEL EDWARD JOLLY
BY
ATTORNEYS.

Patented May 5, 1953

2,637,744

UNITED STATES PATENT OFFICE 2,637,744

EXTRACTION OF NAPHTHENIC ACIDS

Samuel Edward Jolly, Prospect Park, Pa., assignor to Sun Oil Company, Philadelphia, Pa., a corporation of New Jersey Application February 24, 1950, Serial No. 146,136

3 Claims. (Cl. 260—514)

This invention relates to the purification of naphthenic acids and more particularly to the solvent extraction of crude naphthenic acids by means of an improved selective solvent.

Naphthenic acids are present in substantial amounts in crude petroleum of the naphthenic base type and are obtained therefrom in various ways during refining of the crude oil. In commercial practice the naphthenic acids are usually obtained in more or less impure form, for example, as a crude mixture of acids and hydrocarbon oil containing say 25–75% naphthenic acids. Further purification of the crude naphthenic acids is often desirable in order to yield products having greater market value.

According to the present invention, crude naphthenic acids are purified by subjecting the crude mixture, without first saponifying the acids, to solvent extraction with a selective solvent which is composed at least mainly of acetonitrile. I have found that acetonitrile has a high selectivity for naphthenic acids in preference to hydrocarbon oil and is a particularly effective solvent for separating these components by extraction. Its boiling point is sufficiently low that it may readily be recovered for re-use.

The extraction may be conducted either as a simple batch extraction or, in case a high degree of purification is desired, by countercurrently extracting the crude naphthenic acids while utilizing reflux as more fully discussed hereinafter. Substantial purification of the naphthenic acids may be obtained by employing acetonitrile alone. However, an improvement in the selectivity for naphthenic acids may be effected by adding water to the acetonitrile, but the amount of water added generally should not exceed about 25% by weight of the mixture; otherwise the solvent power will decrease sufficiently that inordinately large amounts of solvent will be required. The recommended range of solvent composition is therefore 75–100% acetonitrile and 0–25% water by weight.

In a more specific embodiment the process of the invention comprises extracting the crude naphthentic acids with the azeotropic mixture of acetonitrile and water. These componds form an azeotrope or constant boiling mixture which contains about 16% water when the distillation is conducted at atmospheric pressure. The use of such mixture as the solvent is particularly advantageous in that its recovery for re-use may readily be accomplished without encountering any change in solvent composition, such as is apt to occur when other multicomponent solvents are employed. It is especially desirable to employ the acetonitrile-water azeotrope when the extraction is to be conducted countercurrently in the manner illustrated in Fig. 1 of the accompanying drawings.

The countercurrent extraction of crude naphthenic acids while utilizing reflux to secure a high degree of purification is known. McCorquodale Patent No. 2,391,729 describes such a process in which a countercurrent extraction column having a raffinate-enriching section at one end and an extract-enriching section at the other is utilized. Reflux is obtained for the extract-enriching operation by vaporizing sufficient solvent from the solvent phase which issues from the column to obtain extract which is essentially saturated with solvent, a portion of such extract then being returned to the column as reflux. Another method of effecting the extract refluxing is described and claimed in Honeycutt patent application Serial No. 146,137, filed of even date herewith. According to such method, reflux is obtained within the column itself by cooling the solvent phase as it passes through the extract-enriching section. This causes extract to precipitate from the solvent phase within the column and function as reflux for the extract-enriching operation.

Figure 2:
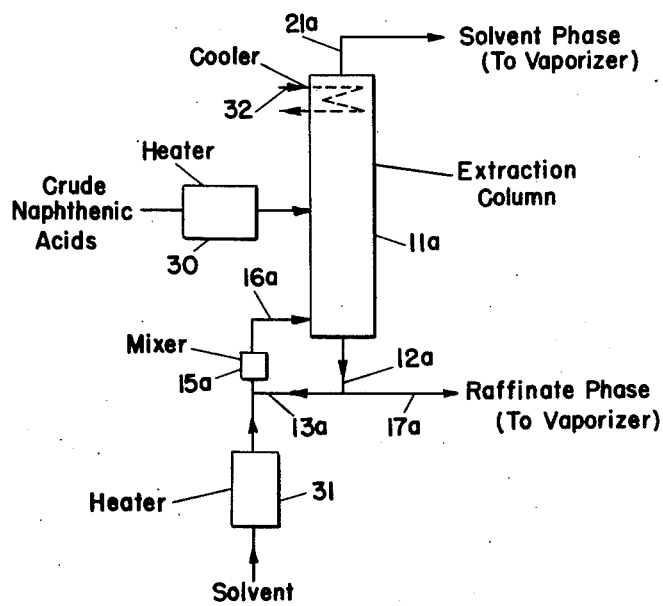

The present invention utilizing the acetonitrile solvent previously specified is applicable to each of the foregoing ways of conducting the countercurrent extraction. Figs. 1 and 2 of the accompanying drawings are schematic illustrations of the modes of operation described, respectively, in the aforesaid patent and patent applications.

Referring to Fig. 1 crude naphthenic acids are continuously introduced through line 10 into a countercurrent extraction zone 11, such as a packed column, at an intermediate level. That portion of the column above line 10 constitutes the extract-enriching section while the portion below constitutes the raffinate-enriching section. The charge after entering the column falls downwardly through the raffinate-enriching section countercurrent to upflowing solvent which preferentially extracts the naphthenic acids. From the bottom of column 11 an oil-rich raffinate phase which is saturated with solvent is continuously removed through line 12. A portion of the withdrawn raffinate phase is recycled through line 13 back to the column as reflux for the raffinate-enriching operation. This recycled portion is commingled with the incoming solvent in line 14 and the mixture passes through mixer 15 and line 16 into the lower part of the column.

For the type of operation illustrated in Fig. 1 it is distinctly preferable to use the azeotropic mixture of acetonitrile and water as the solvent which is introduced through line 14. This insures a constant solvent composition throughout the entire operation.

The portion of raffinate phase from the bottom of column 11 which is not recycled is sent through line 17 in vaporizer 18 for recovery of the solvent. The vaporized solvent is withdrawn overhead through line 19 and after being condensed may be returned to the process for re-use. An oil-rich raffinate product is obtained from the bottom of the vaporizer by means of line 20.

From the top of column 11 the solvent phase containing naphthenic acids in solution passes through line 21 to vaporizer 22. At this point it is desirable to remove solvent in sufficient amount only to obtain from the bottom of the vaporizer extract which is saturated with solvent. A portion of such solvent-saturated extract is then returned by means of line 23 to the top of column 11 as reflux for the extract-enriching operation. It is further desirable that the solvent contained in the recycled extract be of the same composition as the solvent charged to the process. Accordingly, it is distinctly advantageous, as previously stated, to utilize as the solvent the azeotropic mixtures of acetonitrile and water so that the removal of the desired portion of solvent from vaporizer 22 through overhead line 24 may readily be done without causing any change in solvent composition.

The solvent-saturated extract not used as reflux passes through line 25 to another vaporizer 26 for evaporating the rest of the contained solvent. The vaporized solvent issuing through line 27, as well as that obtained from the top of the vaporizer 22, may be condensed and returned for re-use in the process. Solvent-free extract is withdrawn through line 28 and constitutes the purified naphthenic acid product.

The process illustrated in Fig. 2 is generally similar to that of Fig. 1 except that reflux for the extract-enriching operation is obtained within the column itself by conducting the raffinate-enriching operation at an elevated temperature and cooling the solvent phase sufficiently before it reaches the top of the column. For this type of operation the solvent should contain at least 5% water so that a sufficient amount of extract will precipitate upon cooling the solvent phase to provide the necessary reflux. Thus the solvent to be employed according to Fig. 2 should contain between 5% and 25% water by weight, the remainder being acetonitrile.

In Fig. 2 the crude naphthenic acid charge first passes through heater 30 in order to raise the charge temperature preferably to about that at which the raffinate-enriching operation is to be conducted. This temperature may be, for example, within the range of 150–200° F., although higher or lower temperatures may be used if desired. The heated charge then flows into extraction column 11–a. The solvent, which is introduced into the bottom of the column, is likewise heated by means of heater 31 preferably to about the temperature of the raffinate-enriching operation. A portion of the raffinate phase drawn from the bottom of the column through line 12–a is recycled as reflux through line 13–a, mixer 15–a, and line 16–a in the manner described with reference to Fig. 1. The remainder of the raffinate phase is withdrawn through line 17–a and sent to a vaporizer (not shown) for recovery of the solvent.

The solvent phase flowing upwardly through the extract-enriching section is cooled, before it reaches the top of the column, to a temperature at least 25° F. below, and preferably at least 35° F. below, the temperature of the raffinate-enriching operation. By way of example, the temperature in the lower part and at the top of column 11–a may be of the order of 170° F., and 115° F., respectively. The cooling may be done in any suitable manner such as by providing cooling coils 32 within the upper part of the column. Cooling of the solvent phase causes extract to precipitate therefrom, and the precipitated extract flows downward by gravity countercurrent to the solvent phase, thereby functioning as reflux for the extract-enriching operation.

The solvent phase which issues from the top of column 11–a through line 21–a need only be sent to a single vaporizer (not shown) for distilling off all of the solvent to obtain solvent-free extract constituting the purified naphthenic acid product. Refluxing by cooling in the manner just described thus avoids the use of more than one vaporizer for the solvent phase.

The following example, which was obtained by simple batch extraction without reflux, illustrates the selectivity of the present solvent for naphthenic acids in preference to hydrocarbon oil.

The charge was crude naphthenic acids of lubricating oil boiling range obtained from a mixture of Gulf Coastal crudes. It had a saponification value of about 70 mg. KOH/g. and an oil content of about 57% by weight. The solvent employed was a technical grade of acetonitrile to which no water had been added. A batch of the charge was placed in an overflow extractor and the acetonitrile was continuously passed upwardly through it and permitted to flow off. The extract layer stream was continuously distilled and solvent thus recovered was returned to the extractor for re-use. The extraction was continued until the extract layer stream became practically colorless. The resulting solvent-free extract amounted to about 60.5% by weight of the charge and had a saponification value of about 108 and an oil content of about 30%. This extract contained about 93% of the total acidity of the charge. The raffinate, after removal of residual solvent, had a saponification value of only about 12.

From the foregoing example it is apparent that a high degree of purification may be obtained by using acetonitrile as solvent if countercurrent extraction with reflux is employed.

I claim:

1. In a process for purifying naphthenic acids in a countercurrent extraction zone having an extract-enriching section at one end and a raffinate-enriching section at the other, which process comprises feeding crude naphthenic acids, containing at least 25% naphthenic acids together with hydrocarbon oil, to said zone intermediate said sections, feeding into the raffinate-enriching end a solvent selective for naphthenic acids, flowing the solvent through said zone countercurrent to the feed, withdrawing from the raffinate-enriching section a raffinate phase rich in hydrocarbon oil, withdrawing from the extract-enriching section a solvent phase containing extract rich in naphthenic acids and refluxing to the extract-enriching operation extract which is substantially saturated with solvent, the improvement which comprises employing in said process a selective solvent composed of 75–100% acetonitrile and 0–25% water by weight.

2. Process according to claim 1 wherein said solvent is the azeotropic mixture of acetonitrile and water and the solvent phase that is withdrawn from the extract-enriching section is subjected to distillation to remove sufficient solvent to yield extract which is substantially saturated with solvent and a portion of said extract substantially saturated with solvent is returned to the extract-enriching zone as the reflux.

3. Process according to claim 1 wherein said solvent contains at least 5% water and said extract substantially saturated with solvent is refluxed to the extract-enriching operation by cooling the solvent phase flowing in the extract-enriching section to a temperature at least 25° F. lower than the temperature in the raffinate-enriching section, thereby precipitating extract.

SAMUEL EDWARD JOLLY.

References Cited in the file of this patent

UNITED STATES PATENTS

| Number | Name | Date |
|---|---|---|
| 2,023,375 | Van Dijck | Dec. 3, 1935 |
| 2,391,729 | McCorquodale | Dec. 25, 1945 |
| 2,432,532 | Mahan | Dec. 16, 1947 |

FOREIGN PATENTS

| Number | Country | Date |
|---|---|---|
| 441,104 | Great Britain | Jan. 13, 1936 |

OTHER REFERENCES

Ferris et al.: Ind. and Eng. Chem., vol. 23, pp. 753–760 (1931).